(12) United States Patent
Woods

(10) Patent No.: US 10,175,955 B2
(45) Date of Patent: Jan. 8, 2019

(54) SPREADSHEET TOOL MANAGER FOR COLLABORATIVE MODELING

(71) Applicant: HAMILTON SUNDSTRAND SPACE SYSTEMS INTERNATIONAL, INC., Windsor Locks, CT (US)

(72) Inventor: Roberto Woods, South Windsor, CT (US)

(73) Assignee: HAMILTON SUNDSTRAND SPACE SYSTEMS INTERNATIONAL, INC., Windsor Locks, CT (US)

( * ) Notice: Subject to any disclaimer, the term of this patent is extended or adjusted under 35 U.S.C. 154(b) by 2 days.

(21) Appl. No.: 14/995,041

(22) Filed: Jan. 13, 2016

(65) Prior Publication Data

US 2017/0199728 A1 Jul. 13, 2017

(51) Int. Cl.
*G06F 17/30* (2006.01)
*G06F 17/24* (2006.01)
(Continued)

(52) U.S. Cl.
CPC .......... *G06F 8/35* (2013.01); *G06F 8/61* (2013.01); *G06F 8/71* (2013.01); *G06F 9/44526* (2013.01); *G06Q 10/101* (2013.01)

(58) Field of Classification Search
CPC ............ G06F 17/246; G06F 17/30589; G06F 17/30091; G06F 17/30424; G06F 17/2258; G06F 17/2229; G06F 17/30389; G06F 17/30905; G06F 17/30882; G06F 17/2247; G06F 17/30566; G06F 17/30507; G06F 17/50; G06F 17/30964; G06F 17/30926; G06F 17/2705; G06F 21/577;
(Continued)

(56) References Cited

U.S. PATENT DOCUMENTS 5,812,130 A * 9/1998 Van Huben ............ G06Q 10/10
399/81
6,301,591 B2 * 10/2001 Katsumata ............ G06F 17/243
715/222
(Continued)

OTHER PUBLICATIONS

Kevin L.G. Parkin et al., ICEMaker: An Excel-based Environment for Collaborative design, Jan. 25, 2003, [Retrieved on Aug. 29, 2018]. Retrieved from the internet: <URL: https://authors.library.caltech.edu/77583/1/01235550.pdf> 11 Pages (1-11) (Year: 2003).*
(Continued)

*Primary Examiner* — Anibal Rivera
(74) *Attorney, Agent, or Firm* — Cantor Colburn LLP

(57) ABSTRACT

According to an embodiment of the present invention, a computer-implemented method for collaborative management of a plurality of modeling tools is described. The method may include receiving, via a processor, a modeling tool request from a user for a modeling tool configured to operate in a spreadsheet application, determining, via an inventory manager, whether a tool record exists matching the modeling tool request, building, via a tool creation module, a new modeling tool configured to operate in the spreadsheet application responsive to determining that a tool record does not exist, and updating, via the inventory manager, a tool record in an inventory database if a tool record does not exist that matches the modeling tool request.

12 Claims, 6 Drawing Sheets

(51) Int. Cl.
  *G06F 9/44* (2018.01)
  *G06F 17/00* (2006.01)
  *G06F 8/35* (2018.01)
  *G06F 8/71* (2018.01)
  *G06F 8/61* (2018.01)
  *G06F 9/445* (2018.01)
  *G06Q 10/10* (2012.01)

(58) Field of Classification Search
  CPC ........ G06F 21/10; G06Q 10/06; G06Q 10/10;
        G06Q 10/067; G06Q 10/06316; G06Q
                 10/00; G06Q 10/087
  See application file for complete search history.

(56) References Cited

U.S. PATENT DOCUMENTS

| | | | |
|---|---|---|---|
| 6,959,268 B1* | 10/2005 | Myers, Jr. | G06Q 10/06 700/117 |
| 7,233,956 B2* | 6/2007 | Balducci | G06F 17/2247 |
| 7,266,763 B2 | 9/2007 | Peyton-Jones et al. | |
| 7,624,372 B1 | 11/2009 | Stewart | |
| 7,694,315 B2* | 4/2010 | Carter | G06F 8/20 719/328 |
| 7,698,287 B2 | 4/2010 | Becker et al. | |
| 7,702,636 B1* | 4/2010 | Sholtis | G06F 17/30566 707/999.1 |
| 7,877,678 B2* | 1/2011 | Chopin | G06F 17/2247 715/200 |
| 7,987,203 B2* | 7/2011 | Morris | G06Q 40/02 707/793 |
| 8,015,078 B1* | 9/2011 | Scalora | G06Q 10/087 705/28 |
| 8,307,119 B2* | 11/2012 | Rochelle | G06F 17/246 709/248 |
| 8,359,245 B1* | 1/2013 | Ballaro | G06Q 10/087 705/27.1 |
| 8,494,798 B2* | 7/2013 | Kettaneh | G05B 19/41885 702/83 |
| 8,499,290 B2 | 7/2013 | Messerly et al. | |
| 8,645,911 B2 | 2/2014 | Dorman | |
| 8,788,928 B2 | 7/2014 | McColl et al. | |
| 9,053,260 B2* | 6/2015 | Romatier | G05B 17/02 |
| 9,330,080 B2* | 5/2016 | Muenkel | G06F 17/30424 |
| 2002/0032611 A1* | 3/2002 | Khan | G06Q 10/06 705/26.1 |
| 2003/0069908 A1* | 4/2003 | Anthony | G06F 17/2247 715/251 |
| 2003/0172013 A1* | 9/2003 | Block | G06Q 30/02 705/33 |
| 2004/0138815 A1* | 7/2004 | Li | E03B 1/00 702/2 |
| 2004/0148232 A1* | 7/2004 | Fushimi | G06Q 30/06 705/26.62 |
| 2004/0181378 A1* | 9/2004 | Gilmore | G06Q 10/06 703/6 |
| 2004/0204971 A1* | 10/2004 | Graham | G06Q 10/06 700/100 |
| 2004/0230468 A1* | 11/2004 | King | G06Q 10/06 705/7.28 |
| 2005/0015379 A1* | 1/2005 | Aureglia | G06F 17/246 |
| 2005/0055306 A1* | 3/2005 | Miller | G06Q 10/10 705/37 |
| 2005/0187969 A1* | 8/2005 | Chaudri | G06F 17/2258 |
| 2005/0273311 A1* | 12/2005 | Lautt | G06F 17/246 703/22 |
| 2006/0010118 A1* | 1/2006 | Sattler | G06F 17/246 |
| 2006/0010367 A1* | 1/2006 | Sattler | G06F 17/30991 715/209 |
| 2006/0015805 A1* | 1/2006 | Humenansky | G06F 17/246 715/209 |
| 2006/0026137 A1* | 2/2006 | Sattler | G06F 17/246 |
| 2006/0080369 A1* | 4/2006 | Razdow | G06F 17/2229 |
| 2006/0095833 A1 | 5/2006 | Orchard et al. | |
| 2006/0112123 A1* | 5/2006 | Clark | G06F 17/246 |
| 2007/0050702 A1* | 3/2007 | Chopin | G06F 17/2247 715/202 |
| 2007/0162324 A1* | 7/2007 | Suzuki | G06Q 10/06 705/7.26 |
| 2007/0185935 A1* | 8/2007 | Olivieri | G06F 17/246 |
| 2007/0192265 A1* | 8/2007 | Chopin | G06Q 10/10 706/20 |
| 2007/0219956 A1* | 9/2007 | Milton | G06F 17/246 |
| 2007/0220415 A1* | 9/2007 | Cheng | G06F 17/246 715/212 |
| 2008/0082529 A1* | 4/2008 | Mantena | G06Q 10/063 |
| 2008/0228521 A1* | 9/2008 | Wilmering | G06F 17/3056 705/2 |
| 2008/0256432 A1* | 10/2008 | Sambandam | G06F 17/246 715/212 |
| 2008/0263054 A1* | 10/2008 | Eagan | G06F 17/30389 |
| 2009/0083613 A1* | 3/2009 | Davis | G06F 17/30014 715/212 |
| 2009/0150426 A1* | 6/2009 | Cannon | G06F 17/246 |
| 2009/0216786 A1 | 8/2009 | Akiyama et al. | |
| 2009/0235087 A1* | 9/2009 | Bird | G06F 21/10 713/190 |
| 2009/0300482 A1* | 12/2009 | Summers | G06F 17/2705 715/234 |
| 2010/0031141 A1* | 2/2010 | Summers | G06F 17/30926 715/239 |
| 2010/0049746 A1* | 2/2010 | Aebig | G06Q 10/06 705/7.41 |
| 2010/0050264 A1* | 2/2010 | Aebig | G06F 21/577 726/25 |
| 2010/0057237 A1* | 3/2010 | Kettaneh | G05B 19/41885 700/103 |
| 2010/0083085 A1* | 4/2010 | Tow | G06F 17/246 715/212 |
| 2010/0088141 A1* | 4/2010 | Hill | G06Q 10/06 705/7.25 |
| 2010/0145967 A1* | 6/2010 | Fu | G06F 17/30905 707/758 |
| 2010/0217694 A1* | 8/2010 | Knighton | G06Q 10/06 705/31 |
| 2010/0262900 A1* | 10/2010 | Romatier | G05B 17/02 715/219 |
| 2010/0306272 A1* | 12/2010 | Williamson | G06F 17/30589 707/802 |
| 2010/0324867 A1* | 12/2010 | Mital | G06F 17/50 703/1 |
| 2011/0106795 A1* | 5/2011 | Maim | G06F 17/2229 707/728 |
| 2011/0282861 A1* | 11/2011 | Bergstraesser | G06F 17/30507 707/710 |
| 2012/0054590 A1* | 3/2012 | Oh | G06F 17/246 715/212 |
| 2012/0150787 A1 | 6/2012 | Mital et al. | |
| 2012/0197832 A1 | 8/2012 | Shanmukh et al. | |
| 2012/0330995 A1* | 12/2012 | Muenkel | G06F 17/30424 707/769 |
| 2013/0073938 A1* | 3/2013 | Fernandes | G06Q 10/067 715/212 |
| 2013/0085962 A1* | 4/2013 | Duncanson | G06Q 10/067 705/348 |
| 2013/0103615 A1* | 4/2013 | Mun | G06Q 40/06 705/36 R |
| 2013/0124957 A1* | 5/2013 | Oppenheimer | G06F 17/246 715/212 |
| 2013/0132929 A1* | 5/2013 | Weller | G06F 8/70 717/113 |
| 2013/0246127 A1* | 9/2013 | Denton | G06Q 30/0206 705/7.35 |
| 2013/0325531 A1* | 12/2013 | Putten | G06Q 10/0635 705/7.11 |
| 2014/0116776 A1* | 5/2014 | Marx | E21B 44/00 175/24 |
| 2014/0136937 A1 | 5/2014 | Patel et al. | |

(56) References Cited

U.S. PATENT DOCUMENTS

| | | | |
|---|---|---|---|
| 2014/0164895 A1* | 6/2014 | Matheson | G06F 17/246 715/212 |
| 2014/0244416 A1* | 8/2014 | Venkat | G06Q 30/0603 705/26.1 |
| 2014/0351001 A1* | 11/2014 | Agrawal | G06Q 30/0201 705/7.29 |
| 2015/0088932 A1* | 3/2015 | Sauz | G06Q 50/20 707/779 |
| 2015/0254226 A1* | 9/2015 | Renshaw | G06F 17/246 715/219 |
| 2015/0309980 A1 | 10/2015 | Glass et al. | |
| 2015/0317297 A1* | 11/2015 | Chandrasekaran | H04L 67/1085 715/212 |
| 2015/0339604 A1* | 11/2015 | Alikhan | G06Q 10/0635 705/7.28 |
| 2016/0012549 A1* | 1/2016 | Block | G06Q 10/10 705/30 |
| 2016/0018967 A1* | 1/2016 | Sato | G06F 3/04817 715/733 |
| 2016/0021181 A1* | 1/2016 | Ianakiev | H04L 67/1078 709/204 |
| 2016/0055140 A1* | 2/2016 | McKenzie | G06F 17/246 715/212 |
| 2016/0162461 A1* | 6/2016 | Simon | G06F 3/0484 715/220 |

OTHER PUBLICATIONS

Luis M. Camarinha et al., Collaborative networked organizations—Concepts and practice in manufacturing enterprises, Dec. 7, 2008, [Retrieved on Aug. 29, 2018]. Retrieved from the internet: <URL: https://ac.els-cdn.com/S036083520800301X/1-s2.0-S036083520800301X-main.pdf?> 15 Pages (1-15) (Year: 2008).*
Extended European Search Report for EP Application No. 17151136.3-1871, dated Mar. 24, 2017, pp. 1-6.

* cited by examiner

SPREADSHEET TOOL MANAGER FOR COLLABORATIVE MODELING

BACKGROUND

The present disclosure relates to a spreadsheet tool manager, and more specifically, to a spreadsheet tool manager for collaborative modeling.

Space systems engineers have a constant need for rapid creation of new system modeling and analysis tools. When an engineer creates a spreadsheet tool for solving and/or optimizing a model, other engineers may be unaware that the tool exists already. Accordingly, a second engineer may develop a substantially similar analysis tool that solves a similar problem without the benefit of the work of the first engineer. Organizations may miss the opportunity to reuse modeling tools and share cost in the engineering value stream.

Spreadsheet applications such as Microsoft Excel® are often a primary platform in the modeling tool development process because spreadsheet applications do not require special installation, they have a low learning curve, and can provide a powerful capability to perform math, organize information, and visualize data. Visual Basic for Applications (VBA) is a built-in programming language extension used in Microsoft Excel® that allows users to create user-defined functions (UDFs) and macros. VBA can be used for performing quick calculations, performing detailed sizing analyses, modeling steady-state conditions in engineering problems, and even transient modeling.

SUMMARY

According to an embodiment of the present invention, a computer-implemented method for collaborative management of a plurality of modeling tools is described. The method may include receiving, via a processor, a modeling tool request from a user for a modeling tool configured to operate in a spreadsheet application, determining, via an inventory manager, whether a tool record exists matching the modeling tool request, building, via a tool creation module, a new modeling tool configured to operate in the spreadsheet application responsive to determining that a tool record does not exist, and updating, via the inventory manager, a tool record in an inventory database if a tool record does not exist that matches the modeling tool request.

According to other embodiments, a system for collaborative management of a plurality of modeling tools is described. The system may include a processor configured to receive a modeling tool request from a user for a modeling tool configured to operate in a spreadsheet application. The system may be further configured to determine, via an inventory manager, whether a tool record exists matching the modeling tool request, build, via a tool building module, a new modeling tool configured to operate in the spreadsheet application responsive to determining that a tool record does not exist, and update, via the inventory manager, a tool record in an inventory database if a tool record does not exist that matches the modeling tool request.

According to yet other embodiments, a non-transitory computer-readable storage medium is described. The non-transitory storage medium may include program instructions that are executable by a processor to perform a method for collaborative management of a plurality of modeling tools. The method may include receiving, via the processor, a modeling tool request from a user for a modeling tool configured to operate in a spreadsheet application. The method may further include determining, via an inventory manager, whether a tool record exists matching the modeling tool request, building, via a tool creation module, a new modeling tool configured to operate in the spreadsheet application responsive to determining that a tool record does not exist, and updating, via the inventory manager, a tool record in an inventory database if a tool record does not exist that matches the modeling tool request.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
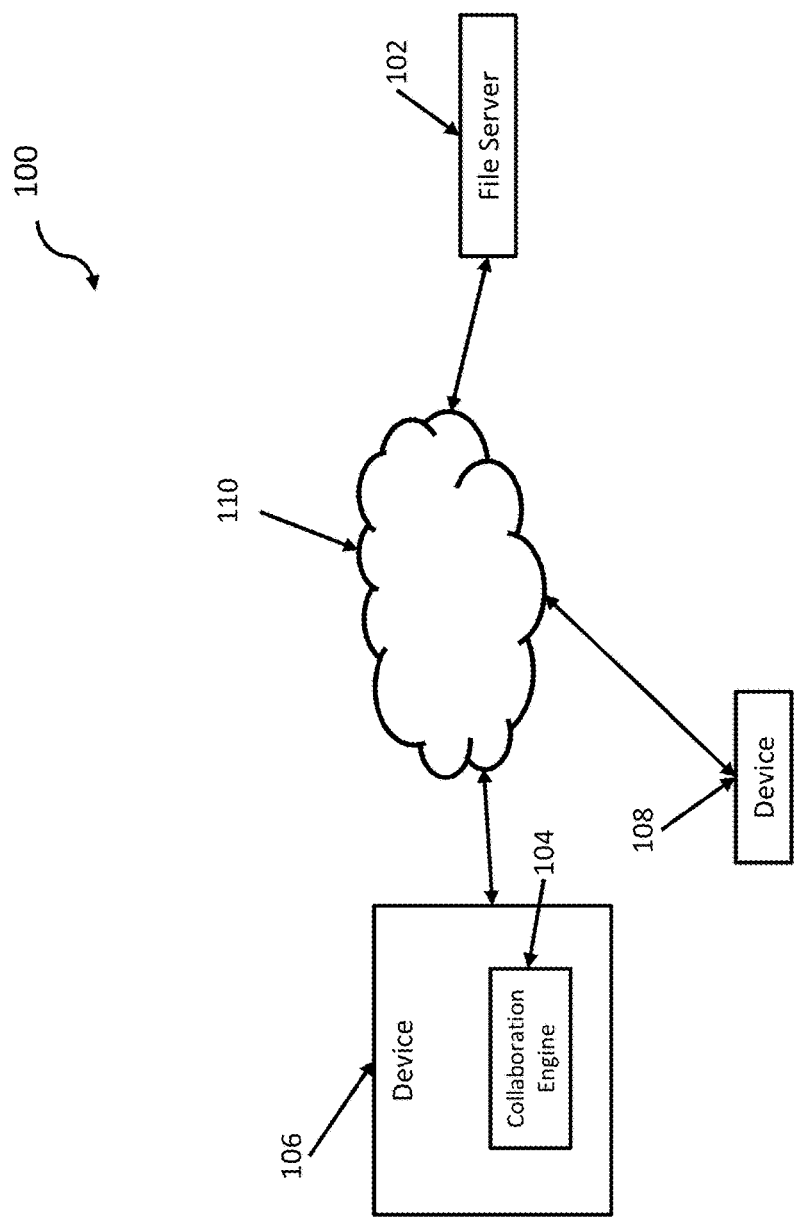
FIG. 1 depicts a computing environment according to some embodiments.

FIG. 1 depicts an exemplary computing environment 100 for practicing embodiments described herein. Referring now to FIG. 1, computing environment 100 may include a file server 102. File server 102 may include a collaboration engine 104.

Collaboration engine 104 may be configured to manage a plurality of modeling tools for solving engineering, design, optimization and/or other data-driven problems. Modeling tools, described in greater detail hereafter, may be spreadsheet-driven analysis tools that may work with spreadsheet applications. According to some aspects, the modeling tools (and more precisely, the computer-executable data comprising the modeling tools) may be accessible and updatable by one or more users located either local to or remote from file server 102. For example, computing environment 100 may include one or more remotely located devices 106 and 108, which may be operatively connected to file sever 102 via network 110.

According to some embodiments, devices 106 and/or 108 may access file server 102 to collaborate with one another by sharing custom-built engineering tools. For example, in some embodiments, file server 102 may receive a modeling tool request from device 106. The request may indicate at least one attribute that could identify an engineering tool suitable for solving a particular engineering problem. The engineering tools may be categorized and stored in one or more tool records.

By way of another example, if a user wishes to convert units in a thermodynamics problem, the user may query file server 102 (via a connected device, e.g., device 108) for one or more tool records associated with modeling tools directed to solving thermodynamics problems. The one or more tool records may include information in connection with that have custom built engineering tools that work within a spreadsheet application that may convert engineering units. Accordingly, collaboration engine 104 may receive the modeling tool request, determine whether a tool record exists that matches the modeling tool request, and either transmit a matching tool record for the user's local spreadsheet application or build a new modeling tool configured to perform the requested operation. Collaboration engine 104 may store the modeling tool as a tool record so that other users may benefit from the work performed by the original creation of the modeling tool.

Figure 2:
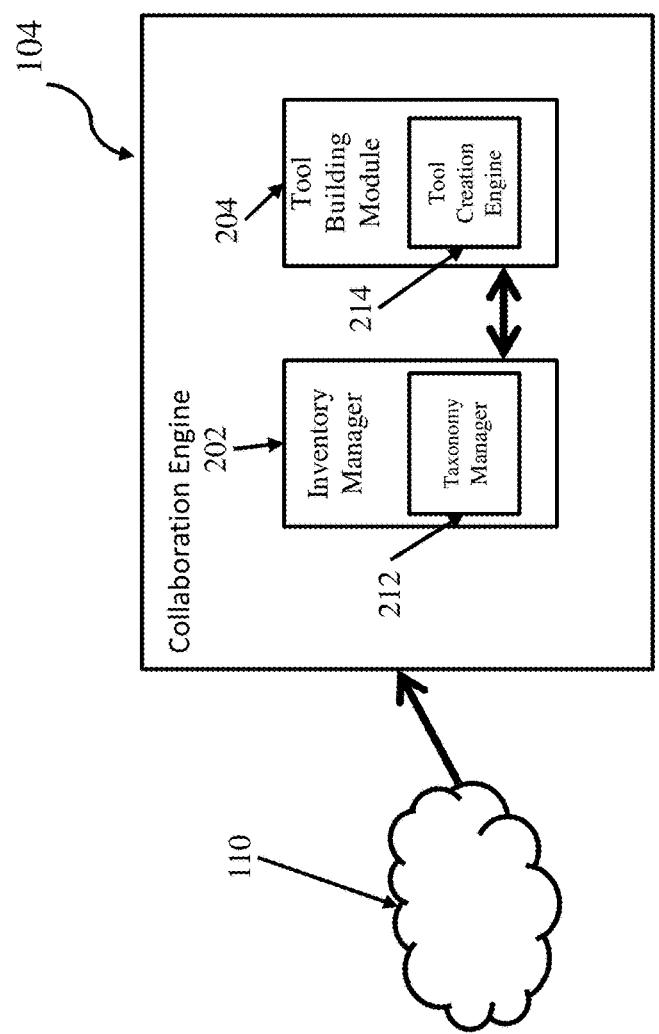
FIG. 2 depicts a collaboration engine according to some embodiments.
Figure 3:
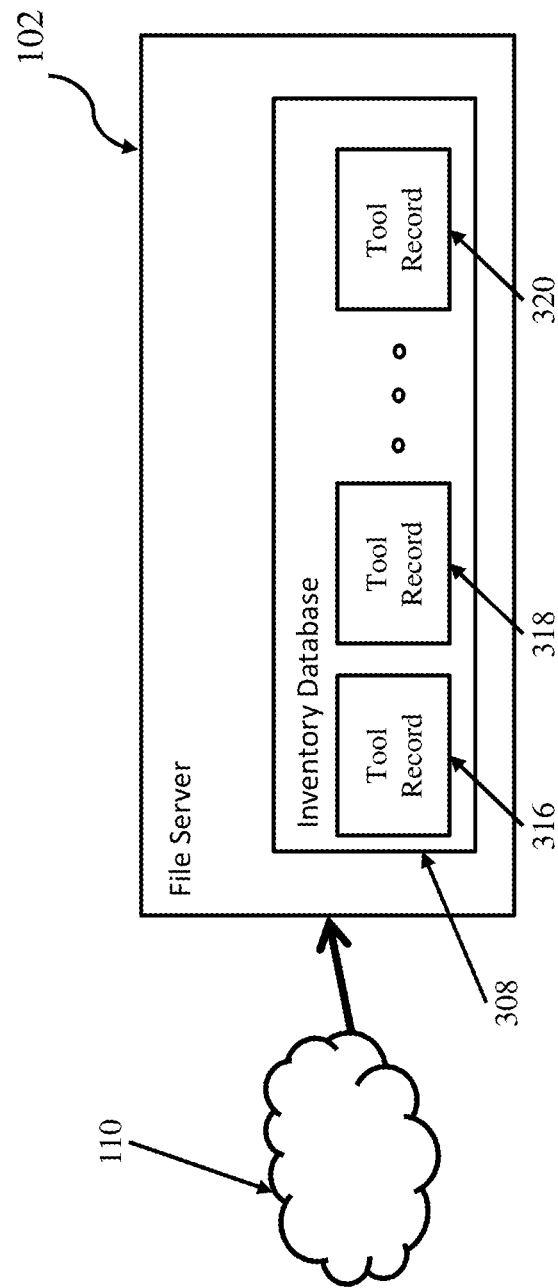
FIG. 3 depicts a file server according to some embodiments.

FIG. 2 depicts a collaboration engine 104, according to some embodiments. Collaboration engine 104 may include an inventory manager 202 and a tool building module 204. According to some embodiments, inventory manager 202 may include a taxonomy manager 212 that may be configured to determine a taxonomy data structure for one or more tools records 216, 218, 220, etc. For example, a taxonomy data structure may include one or more categories of units converters. As another example, a category of fluid dynamics may include one or more types of fluid dynamics problems and/or attributes such as, for example, inlet boundary condition problems, outlet boundary condition problems, constant and dynamic pressure problems, etc. According to some embodiments, taxonomy manager 212 may be configured to receive one or more modeling tool requests from a user, determine whether a tool record exists that matches the modeling tool request, and assign a new tool record to an inventory database (e.g., inventory database 308 as shown in FIG. 3). Taxonomy manager 212 may create one or more taxonomic data structures for categorizing and cataloging the modeling tool if a new modeling tool is to be created by collaboration engine 104.

In some embodiments, a processor in server 102 (e.g., processor 601, described with respect to FIG. 6) may determine, after receiving a tool record request from a user, that a tool record does not exist in inventory database 208. Accordingly, processor 601 may provide prompts and receive corresponding user inputs that build, via a tool creation engine 214, a new modeling tool configured to operate in a spreadsheet application. In some aspects, processor 601 may receive the tool record request containing one or more attributes descriptive of a particular engineering problem. Processor 601 may make the determination that a tool record exists or does not exist in inventory database 208 based on user input indicated in the tool record request. Processor 601 may make the determination based on the one or more attributes received by the user. For example, a thermodynamics problem may have associated with it variables that could include pressure, volume, stress/strain pairs, temperature, entropy pair, etc. Processor 601 may receive the modeling tool request, determine whether a tool record exists matching at least one attribute from the request (e.g., a calculation type, category of engineering problem, etc.), and output a selectable list of at least one tool record having the attribute in common. Accordingly, processor 601 may receive the modeling tool and install the tool on the requesting device. The transmission may be based on an autonomous choice made by processor 601, or based on user input indicative of a tool selection.

Referring now to FIG. 3, file server 102 is depicted according to some embodiments. In some aspects, file server 102 may include an inventory database 308, which may be configured to include a plurality of tool records 316, 318, 320, etc. A tool record (e.g., tool record 316) may include one or more computer-executable models of Microsoft Visual Basic (VBA) code configured to solve one or more particular engineering modeling problems. Although three tool records 316, 318 and 320 are depicted, it should be appreciated that any number of tool records are contemplated within inventory database 308.

Figure 4:
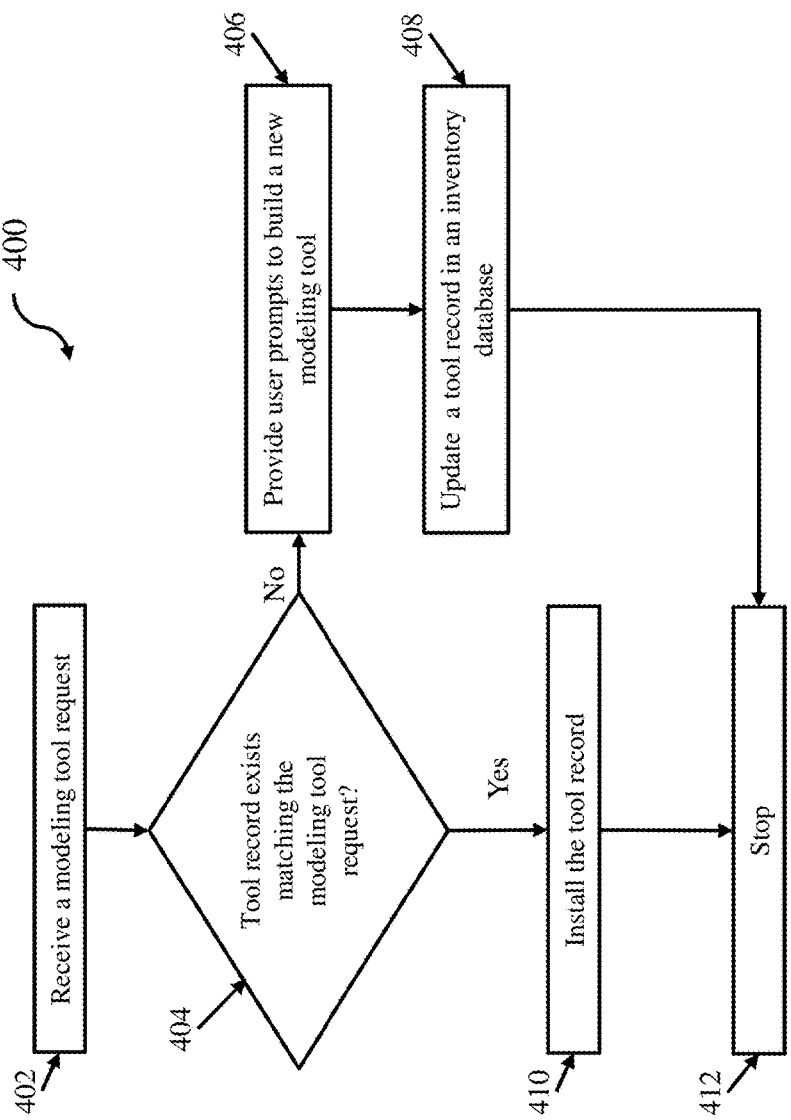
FIG. 4 depicts a flow diagram of a computer-implemented method for collaborative management of a plurality of modeling tools according to one embodiment.

FIG. 4 depicts a flow diagram of a computer-implemented method 300 for collaborative management of a plurality of modeling tools, according to one embodiment. Referring now to FIG. 4, in some aspects processor 601 may receive an engineering tool request from a user operating device 108. As shown in decision block 404, processor 601 may determine whether a tool record exists that matches the modeling tool request.

If no record exists, as shown in block 406, processor 601 may provide user prompts to build a new engineering tool. For example, in some aspects, processor 601 may prompting the user to input one or more attributes associated with the modeling problem. According to one embodiment, processor 601 may prompt a user to instantiate a new code modules "from scratch" on the local client, and just save it to inventory database 308. In another aspect, processor 601 may prompt the user to create a dummy code module locally using a tool record template, which may be configured to provide executable instructions for prompting the user for information, providing prompts for the user to fill in the template, then save it to inventory database 308. In some embodiments, the tool record template may be saved as part of collaboration engine 104. In other embodiments, the tool record template may be saved on file server 102, and may be transmitted to device 106 when called by processor 601.

After building the new modeling tool, processor 601 may create taxonomy information in connection with a tool record 316, and update tool record 316 in inventory database 308, as shown in block 408. At block 412 the process may conclude.

In other aspects, tool creation engine 214 may provide a utility for creating and sharing robust user-defined functions that work in a spreadsheet application. For example, tool creation engine 214 may provide a single-click utility for creation of new modules and functions with easy to fill-in templates of code that may receive a category of information from a user and create a tool with a user-initiated click. In other aspects, tool creation engine 214 may provide a utility for quick saving of new modules (modeling tools) to the development library (e.g., inventory database 308) as well means for branching & revising of existing tool records.

According to yet other embodiments, at block 406 processor 601 may install a tool record from the library (e.g., tool record 316), and prompt the user to make changes to the local copy of tool record 316. Accordingly, processor 601 may receive user input and create an appended version of tool record 316. In some aspects processor 601 may compare the appended version of tool record 316 to tool record 316 saved in inventory database 308, and prompt the user to save the revised tool record in inventory database 308.

According to other embodiments, tool creation engine 214 may provide a utility for comparing an existing current spreadsheet workbook code to the library saved in inventory database 208. In some aspects tool creation engine 214 may determine whether changes have been made to a tool record that is saved in inventory database 308. For example, if a user has received and installed a particular tool record from inventory database 308, tool creation engine 214 may determine whether changes have been made to the saved record and alert the user to any changes. In other aspects, tool creation engine 214 may be configured to identify dependent modules where one mode depends from another module. Accordingly, users may build upon other's work.

As shown in decision block 404, if processor 601 determines, based on the modeling request, that a tool record does exist (e.g., tool record 318), processor 601 may transmit modeling tool to the user, as shown in block 410. The modeling tool may include computer-executable information that device 108 may use for local installation of tool record, and then conclude the process as shown in block 412.

Figure 5:
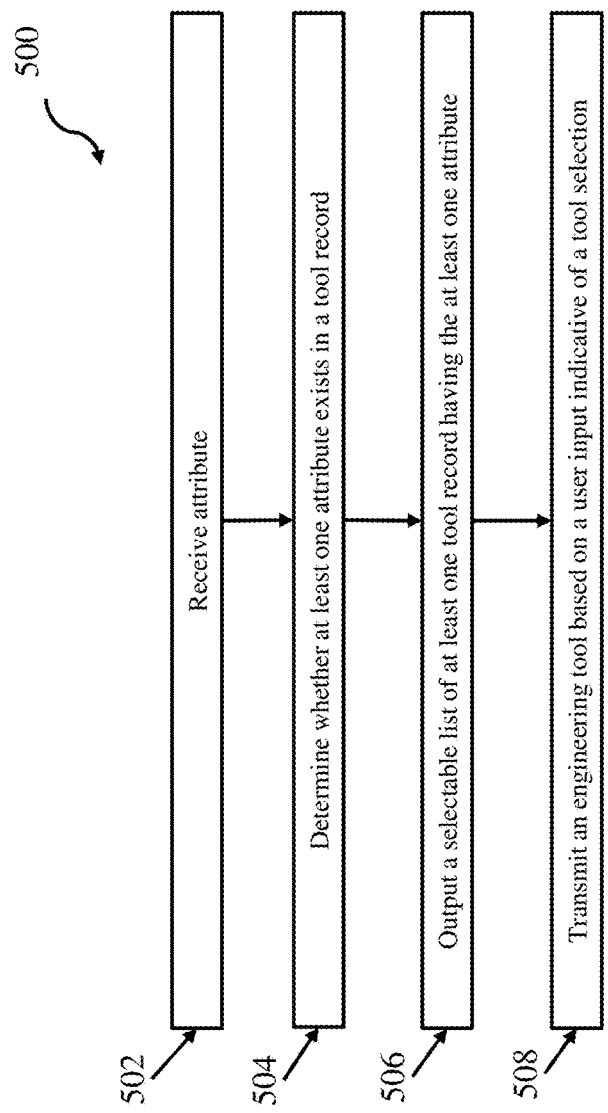
FIG. 5 depicts a flow diagram of a method for managing a tool record according to one embodiment.

FIG. 5 depicts a flow diagram of a computer-implemented method 500 for determining whether a tool record exists, according to one embodiment. Referring now to FIG. 5, processor 601 may receive at least one modeling tool attribute included in a modeling tool record request, as shown in block 502. As shown in block 504, processor 601 may determine whether at least one attribute exists in a tool record that is shared with the requested modeling tool. According to some embodiments, as shown in block 506, processor 601 may output a selectable list of at least one tool record having the at least one attribute and transmit the modeling tool to the user based on user input indicative of a tool selection, as shown in block 508. The selectable list may be output to the user for user-selection on the requesting device (e.g., device 106).

Figure 6:
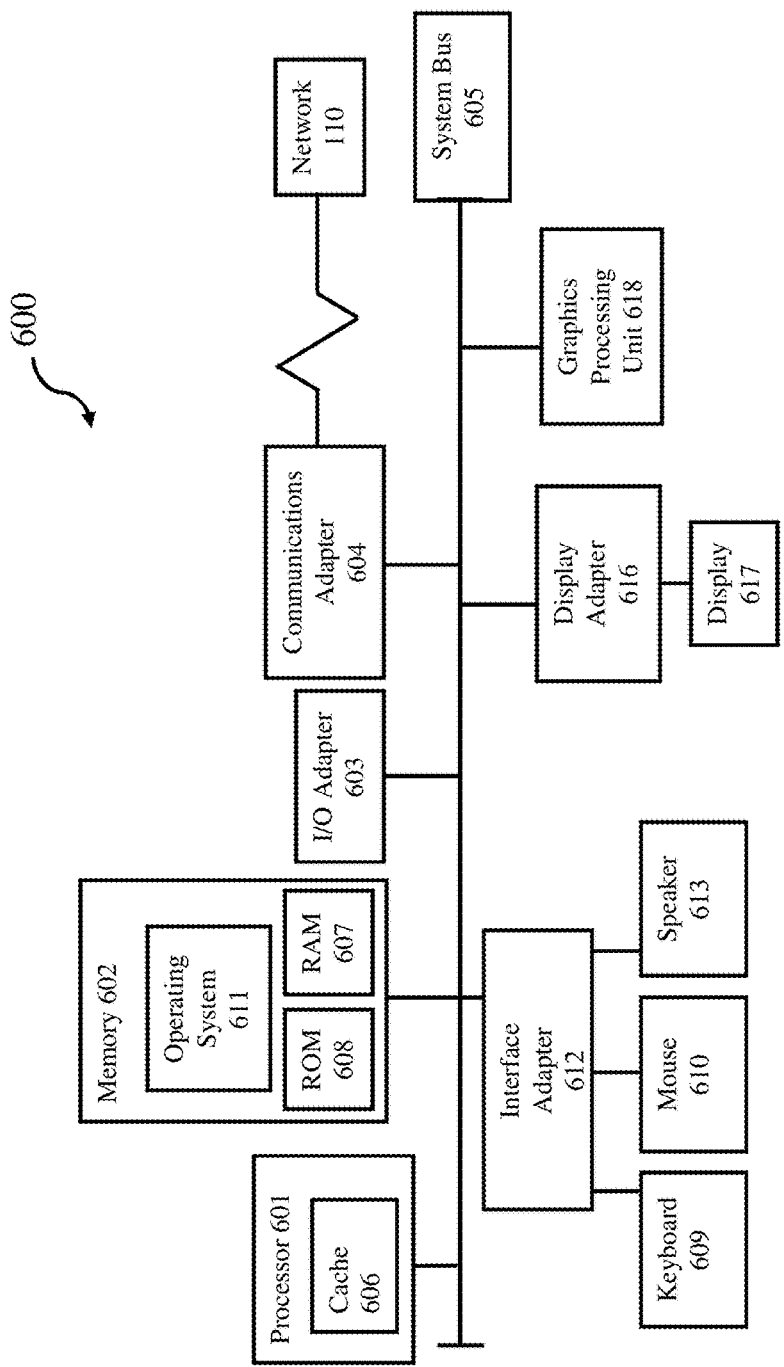
FIG. 6 illustrates a block diagram of a computer system for use in practicing the teachings herein.

FIG. 6 illustrates a block diagram of a computer system 600 (hereafter "computer 600") for use in practicing the embodiments described herein. For example, computer system 600 may embody device 106 and/or device 108. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 600 therefore can embody a general-purpose computer. In another exemplary embodiment, the methods described herein are implemented as part of a mobile device, such as, for example, a mobile phone, a personal data assistant (PDA), a tablet computer, a laptop computer, etc.

In an exemplary embodiment, in terms of hardware architecture, as shown in FIG. 6, the computer 600 includes processor 601. Computer 600 also includes memory 602 coupled to processor 601, and one or more input/output adaptors 603 that may be communicatively coupled via system bus 605. Memory 602 may be operatively coupled to one or more internal or external memory devices. Communications adaptor 604 may be operatively connect computer 600 to one or more networks 110. A system bus 605 may also connect one or more user interfaces via interface adaptor 612. Interface adaptor 612 may connect a plurality of user interfaces to computer 600 including, for example, keyboard 609, mouse 610, speaker 613, etc. System bus 605 may also connect display adaptor 616 and display 617 to processor 601. Processor 601 may also be operatively connected to graphical processing unit 618.

Processor 601 is a hardware device for executing hardware instructions or software, particularly that stored in a non-transitory computer-readable memory (e.g., memory 602). Processor 601 can be any custom made or commercially available processor, a central processing unit (CPU), a plurality of CPUs, for example, processor 601, an auxiliary processor among several other processors associated with the computer 600, a semiconductor based microprocessor (in the form of a microchip or chip set), or generally any device for executing instructions. Processor 601 can include a memory cache 606.

Memory 602 can include random access memory (RAM) 607 and read only memory (ROM) 608. RAM 607 can be any one or combination of volatile memory elements (e.g., DRAM, SRAM, SDRAM, etc.). ROM 608 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 602 may incorporate electronic, magnetic, optical, and/or other types of non-transitory computer-readable storage media. Note that the memory 602 can have a distributed architecture, where various components are situated remote from one another, but can be accessed by the processor 601.

The instructions in memory 602 may include one or more separate programs, which may comprises an ordered listing of computer-executable instructions for implementing logical functions. In the example of FIG. 6, the instructions in memory 602 may include an operating system 611. Operating system 611 can control the execution of other computer programs and provides scheduling, input-output control, file and data management, memory management, and communication control and related services.

Input/output adaptor 603 can be, for example but not limited to, one or more buses or other wired or wireless connections, as is known in the art. Input/output adaptor 603 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 612 may be configured to operatively connect one or more input/output (I/O) devices to computer 600. For example, interface adaptor 612 may connect a keyboard 609 and mouse 610. Other output devices, e.g., speaker 613 may be operatively connected to interface adaptor 612. Other output devices may also be included, although not shown. For example, devices may include but are not limited to a printer, a scanner, microphone, and/or the like. Finally, the I/O devices connectable to interface adaptor 612 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 600 can further include display adaptor 616 coupled to one or more displays 617. In an exemplary embodiment, computer 600 can further include communications adaptor 604 for coupling to a network 110.

Network 110 can be an IP-based network for communication between computer 600 and any external device. Network 110 transmits and receives data between computer 600 and devices and/or systems external to computer 600. In an exemplary embodiment, network 110 can be a managed IP network administered by a service provider. Network 110 may be a network internal to an aircraft, such as, for example, an avionics network, etc. Network 110 may be implemented in a wireless fashion, e.g., using wireless protocols and technologies, such as WiFi, WiMax, etc. Network 110 may also be a wired network, e.g., an Ethernet network, an ARINC 429 network, a CAN, etc., having any wired connectivity including, e.g., an RS232 connection, R5422 connection, etc. Network 115 can also be a packet-switched network such as a local area network, wide area network, metropolitan area network, Internet network, or other similar type of network environment. The network 115 may be a fixed wireless network, a wireless local area network (LAN), a wireless wide area network (WAN) a personal area network (PAN), a virtual private network (VPN), intranet or other suitable network system.

If computer 600 is a PC, workstation, laptop, tablet computer and/or the like, the instructions in the memory 602 may further include a basic input output system (BIOS) (omitted for simplicity). The BIOS is a set of essential routines that initialize and test hardware at startup, start operating system 611, and support the transfer of data among the operatively connected hardware devices. The BIOS is stored in ROM 608 so that the BIOS can be executed when computer 600 is activated. When computer 600 is in operation, processor 601 may be configured to execute instructions stored within the memory 602, to communicate data to and from the memory 602, and to generally control operations of the computer 600 pursuant to the instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for collaborative management of a plurality of modeling tools comprising:
    receiving, via a processor, a modeling tool request from a user for a modeling tool configured to perform operations in a spreadsheet application and to solve an engineering problem;
    determining, via an inventory manager, that a tool record matching the modeling tool request does not exist;
    building, via a tool creation module, a new modeling tool configured to operate in the spreadsheet application responsive to determining that a tool record does not exist;
    updating, via the inventory manager, the inventory database if a tool record does not exist that matches the modeling tool request to include the new modelling tool;
    prompting, via a processor, a user for information regarding an attribute of the new modeling tool, wherein the attribute comprises an engineering calculation;
    receiving, via a processor, user input indicative of the attribute;
    categorizing, via a taxonomy manager, the new modeling tool into a category of modeling tools having the attribute in common with the new modeling tool, wherein the taxonomy manager is configured to determine a taxonomy data structure that includes one or more categories of unit converters; and
    saving, in the inventory database, the new modeling tool, wherein the new modeling tool is accessible by at least one other user.

2. The computer-implemented method of claim 1, wherein determining whether a tool record exists comprises:
    receiving, from a user, at least one attribute;
    determining, via a taxonomy manager, whether the at least one attribute exists in a tool record;
    outputting, via an output device, a selectable list of at least one tool record having the at least one attribute; and
    retrieving a modeling tool based on a user input indicative of a tool selection.

3. The computer-implemented method of claim 1, further comprising:
    receiving, via the processor, an existing modeling tool based on the modeling tool request responsive to determining that the tool record exists in the inventory database.

4. The computer-implemented method of claim 3, wherein the existing modeling tool is installable on a remote device.

5. A system for collaborative management of a plurality of modeling tools comprising a processor configured to:
    receive, via the processor, a modeling tool request from a user for a modeling tool configured to perform operations in a spreadsheet application;
    determine, via an inventory manager, determining, via an inventory manager, that a tool record matching the modeling tool request does not exist;
    build, via a tool creation module, a new modeling tool configured to operate in the spreadsheet application responsive to determining that the tool record does not exist;
    update, via the inventory manager, the inventory database to include the new modelling tool if a tool record does not exist that matches the modeling tool request;
    prompt a user for information regarding an attribute of the new modeling tool, wherein the attribute comprises an engineering calculation;
    receive user input indicative of the attribute;
    categorize, via a taxonomy manager, the modeling tool into a category of modeling tools having the attribute in common with the modeling tool, wherein the taxonomy manager is configured to determine a taxonomy data structure that includes one or more categories of unit converters; and
    save, in the inventory database, the modeling tool, wherein the modeling tool is accessible by at least one other user.

6. The system of claim 5, wherein the processor is configured to determine whether a tool record exists comprises:
    receive at least one attribute;
    determine, via a taxonomy manager, whether the at least one attribute exists in a tool record;
    output, via an output device, a selectable list of at least one tool record having the at least one attribute; and
    retrieve a modeling tool based on a user input indicative of a tool selection.

7. The system of claim 5, wherein the processor is further configured to:
    receive an existing modeling tool based on the modeling tool request responsive to determining that the tool record exists in the inventory database.

8. The system of claim 7, wherein the existing modeling tool is installable on a remote device.

9. A non-transitory computer-readable storage medium comprising program instructions that are executable by a processor that, when executed, perform a method for collaborative management of a plurality of modeling tools, the method comprising:

receiving, via the processor, a modeling tool request from a user for a modeling tool configured to perform operations in a spreadsheet application;

determining, via an inventory manager, that a tool record matching the modeling tool request does not exist;

building, via a tool building module, a new modeling tool configured to operate in the spreadsheet application responsive to determining that a tool record does not exist;

updating, via the inventory manager, the inventory database if a tool record does not exist that matches the modeling tool request to include the new modelling tool;

prompting, via a processor, a user for information regarding an attribute of the new modeling tool, wherein the attribute comprises an engineering calculation;

receiving, via a processor, user input indicative of the attribute;

categorizing, via a taxonomy manager, the modeling tool into a category of modeling tools having the attribute in common with the modeling tool, wherein the taxonomy manager is configured to determine a taxonomy data structure that includes one or more categories of unit converters; and saving, in the inventory database, the modeling tool, wherein the modeling tool is accessible by at least one other user.

10. The non-transitory computer-readable storage medium of claim 9, wherein determining whether a tool record exists comprises:

receiving, from a user, at least one attribute;

determining, via a taxonomy manager, whether the at least one attribute exists in a tool record;

outputting, via an output device, a selectable list of at least one tool record having the at least one attribute; and retrieving a modeling tool based on a user input indicative of a tool selection.

11. The non-transitory computer-readable storage medium of claim 9, further comprising:

receiving, via the processor, an existing modeling tool based on the modeling tool request responsive to determining that the tool record exists in the inventory database.

12. The non-transitory computer-readable storage medium of claim 11, wherein the existing modeling tool is installable on a remote device.

* * * * *